US010060354B2

(12) United States Patent
Suciu et al.

(10) Patent No.: US 10,060,354 B2
(45) Date of Patent: Aug. 28, 2018

(54) TURBINE ENGINE CASE MOUNT AND DISMOUNT

(71) Applicant: United Technologies Corporation, Farmington, CT (US)

(72) Inventors: Gabriel L. Suciu, Glastonbury, CT (US); Ioannis Alvanos, West Springfield, MA (US); Brian Merry, Andover, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/445,521

(22) Filed: Feb. 28, 2017

(65) Prior Publication Data

US 2017/0175633 A1 Jun. 22, 2017

Related U.S. Application Data

(63) Continuation of application No. 13/417,615, filed on Mar. 12, 2012, now abandoned.

(51) Int. Cl.

| | |
|---|---|
| ***B64D 27/10*** | (2006.01) |
| ***F02C 7/20*** | (2006.01) |
| ***B64D 27/26*** | (2006.01) |

(52) U.S. Cl.

CPC ................ *F02C 7/20* (2013.01); *B64D 27/10* (2013.01); *B64D 27/26* (2013.01); *B64D 2027/262* (2013.01); *F05D 2220/323* (2013.01); *F05D 2230/60* (2013.01); *F05D 2240/90* (2013.01)

(58) Field of Classification Search

CPC ........... F02C 7/20; B64D 27/10; B64D 27/26; B64D 2027/262; F05D 2240/90; F05D 2230/60; F05D 2220/323

See application file for complete search history.

(56) References Cited

U.S. PATENT DOCUMENTS

| | | | | |
|---|---|---|---|---|
| 3,727,862 | A | 4/1973 | Kaufhold et al. | |
| 3,979,087 | A * | 9/1976 | Boris | B64D 27/18 244/54 |
| 4,266,741 | A | 5/1981 | Murphy | |
| 4,603,822 | A | 8/1986 | Chee | |
| 4,717,094 | A | 1/1988 | Chee | |
| 5,277,382 | A | 1/1994 | Seelen et al. | |
| 5,427,348 | A | 6/1995 | Bacon et al. | |

(Continued)

FOREIGN PATENT DOCUMENTS

| | | |
|---|---|---|
| EP | 2025898 A2 | 2/2009 |

OTHER PUBLICATIONS

International Search Report and Written Opinion from PCT Application Serial No. PCT/US2013/029006, dated Jun. 13, 2013, 13 pages.

*Primary Examiner* — Jun Yoo

(74) *Attorney, Agent, or Firm* — Kinney & Lange, P.A.

(57) ABSTRACT

A method for mounting a gas turbine engine having a compressor section, a combustor section, a turbine section, a pylon and a rear mount bracket, includes positioning the mounting bracket between the gas turbine engine and the pylon. The mounting bracket is connected to the turbine case reacting a least a vertical load, a side load, a thrust load, and a torque load from the gas turbine engine through the mounting bracket. The mounting bracket is attached to the pylon reacting the same loads from the gas turbine engine.

9 Claims, 5 Drawing Sheets

(56) References Cited

U.S. PATENT DOCUMENTS

| | | | | |
|---|---|---|---|---|
| 5,497,961 | A * | 3/1996 | Newton ................. | B64D 29/00 244/54 |
| 5,725,181 | A | 3/1998 | Hey | |
| 5,860,275 | A | 1/1999 | Newton et al. | |
| 6,330,995 | B1 | 12/2001 | Mangeiga et al. | |
| 7,677,493 | B2 | 3/2010 | Diochon et al. | |
| 8,256,707 | B2 | 9/2012 | Suciu et al. | |
| 2004/0245383 | A1 | 12/2004 | Udall | |
| 2007/0108341 | A1 | 5/2007 | Diochon et al. | |
| 2009/0056343 | A1 | 3/2009 | Suciu et al. | |
| 2009/0183512 | A1 | 7/2009 | Suciu et al. | |
| 2009/0236469 | A1 | 9/2009 | Suciu et al. | |
| 2009/0314881 | A1 | 12/2009 | Suciu et al. | |

* cited by examiner 32
30
52
54
50
22
44
42
24
31
40
20
30
18
38
36
16
35
48
34
46
46
14
10
26

TURBINE ENGINE CASE MOUNT AND DISMOUNT

CROSS-REFERENCE TO RELATED APPLICATION(S)

This application is a continuation of U.S. application Ser. No. 13/417,615 filed Mar. 12, 2012 for "Turbine Engine Case Mount and Dismount" by G. Suciu, I. Alvanos, and B. Merry and is hereby incorporated by reference in its entirety.

BACKGROUND

The subject matter disclosed herein relates generally to an engine mounting configuration and, in particular, to an engine mounting configuration for mounting a turbofan gas turbine engine to an aircraft pylon.

A gas turbine engine may be mounted at various points on an aircraft such as a pylon integrated with an aircraft structure. An engine mounting configuration ensures the transmission of loads between the engine and the aircraft structure. The loads typically include the weight of the engine, its thrust, aerodynamic loads, maneuver loads, and rotary torque about the engine axis. The engine mounting configuration must also absorb the deformations to which the engine is subjected during different flight phases and the dimensional variations due to thermal expansion and retraction.

One conventional engine mounting configuration includes a pylon having a forward mount and an aft mount. The front fan case mount handles the vertical and side loads from the front of the engine. The rear mount handles vertical and side loads from the rear of the engine, engine torque, and thrust through a set of thrust links reaching from the rear mount forward to the intermediate case.

External components including mounts, electrical systems, lubrication systems, fuel systems, and the like all reside on the outside shell of the engine core. As engines are becoming small in core size, these components tend not to scale linearly, if at all, in size causing an issue for the proper attachment of the hardware to the smaller sized engine casings. The typical mounting systems include numerous poles and brackets, which extend into areas also needed for the additional hardware. A system that would reduce the size of the mounting system, and thus the time to attach the engine to an aircraft, would prove beneficial.

SUMMARY

In one embodiment, a method of mounting a gas turbine engine to a pylon is disclosed. The method includes attaching a mount bracket to the turbine exhaust case, and attaching a distal end of the mount bracket to the pylon with a single pin.

In another embodiment, a method for mounting a gas turbine engine having a compressor section, a combustor section, a turbine section, a pylon and a rear mount bracket, may include positioning the mounting bracket between the gas turbine engine and the pylon. The mounting bracket is connected to the turbine case reacting a least a vertical load, a side load, and a torque and thrust loads from the gas turbine engine through the mounting bracket. The mounting bracket is attached to the pylon reacting the same loads from the gas turbine engine to the pylon.

In yet another embodiment, a method of mounting a gas turbine engine to a pylon is done attaching a mounting bracket to a pylon with a single pin connection that reacts a vertical load of the engine.

DETAILED DESCRIPTION

Figure 1:
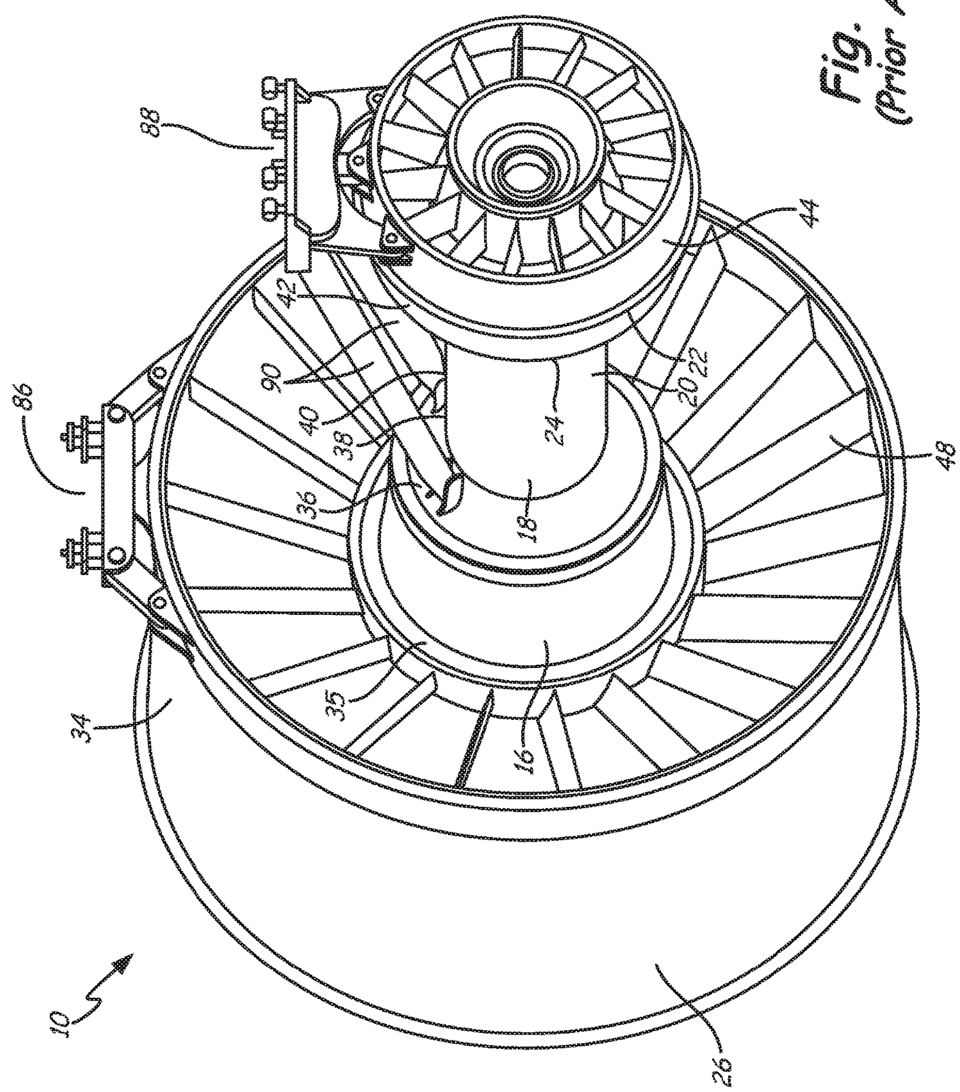
FIG. 1 is a perspective view of a prior art turbofan gas turbine engine.

FIG. 1 illustrates a perspective view of gas turbofan engine 10 suspended from a mounting system that includes fan case or front mount 86, rear mount 88, and thrust links 90. Turbofan engine 10 includes a core engine that includes low pressure compressor 16, high pressure compressor 18, and combustor 20. Turbofan engine 10 also includes low pressure turbine 22 and high pressure turbine 24. Fan section 26 is connected to low pressure compressor 16 either directly or through a gear train (not shown). The engine is mounted to an aircraft through front mount 86 and rear mount 88, and thrust links 90 extend from rear mount 88 to intermediate case 36. The arrangement with thrust links 90 is utilized to minimize the thrust induced bending of the engine core which would be caused if the thrust were reacted at the rear mount points shown in FIG. 1 at the top of the turbine exhaust case. Bending of the engine core causes the clearances between the engine blade tips and the shrouding to increase causing a decrease in engine performance. External components (not illustrated) including additional mounts, electrical systems, lubrication systems, fuel systems, and the like all reside on the outside shell of the engine core. The thrust links 90 reduce the area available for positioning of the external components, causing an issue for the proper packaging of the hardware within the space between the engine cases and the nacelle core cowls.

Figure 2:
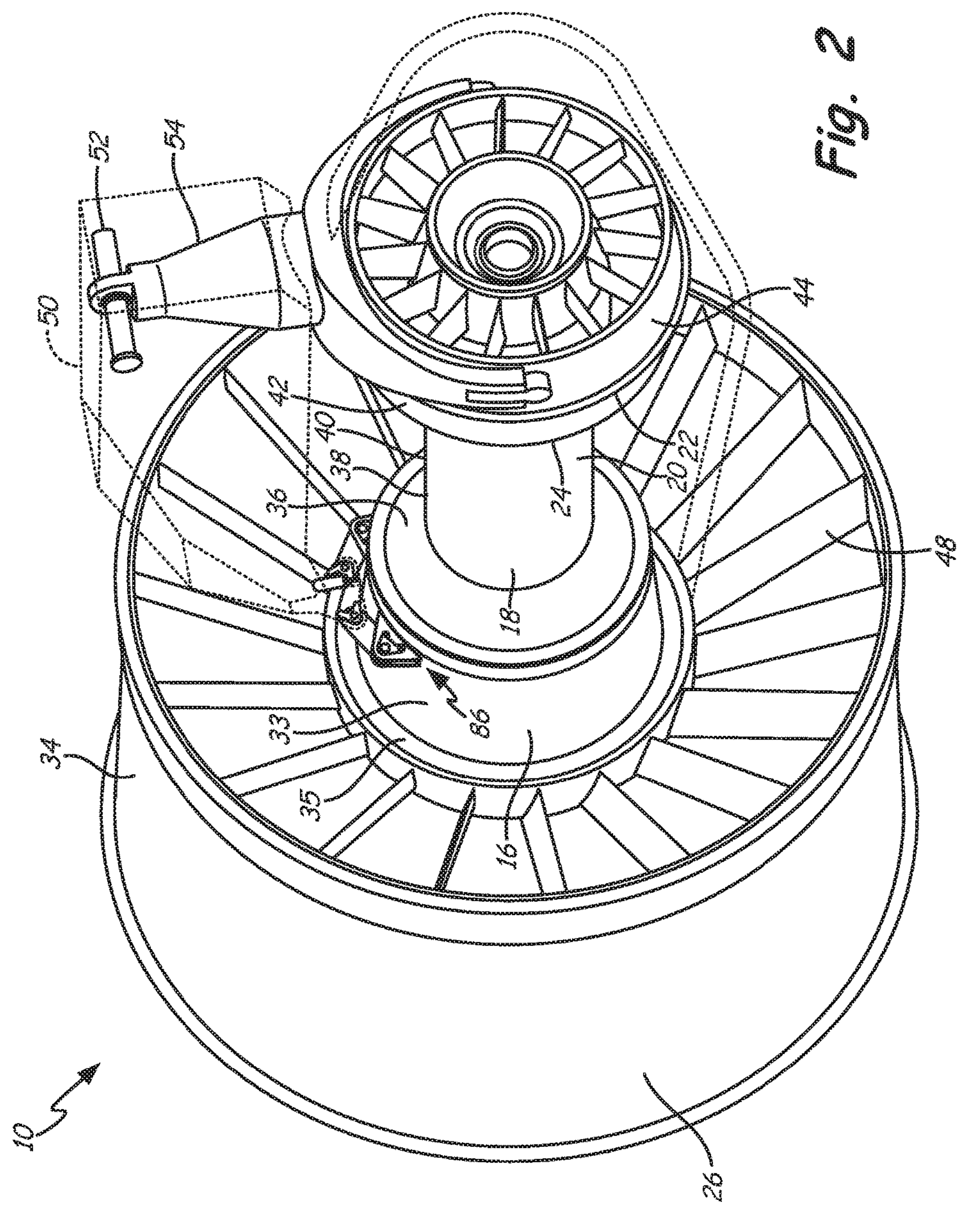
FIG. 2 is a perspective view of a turbofan gas turbine engine.
Figure 3:
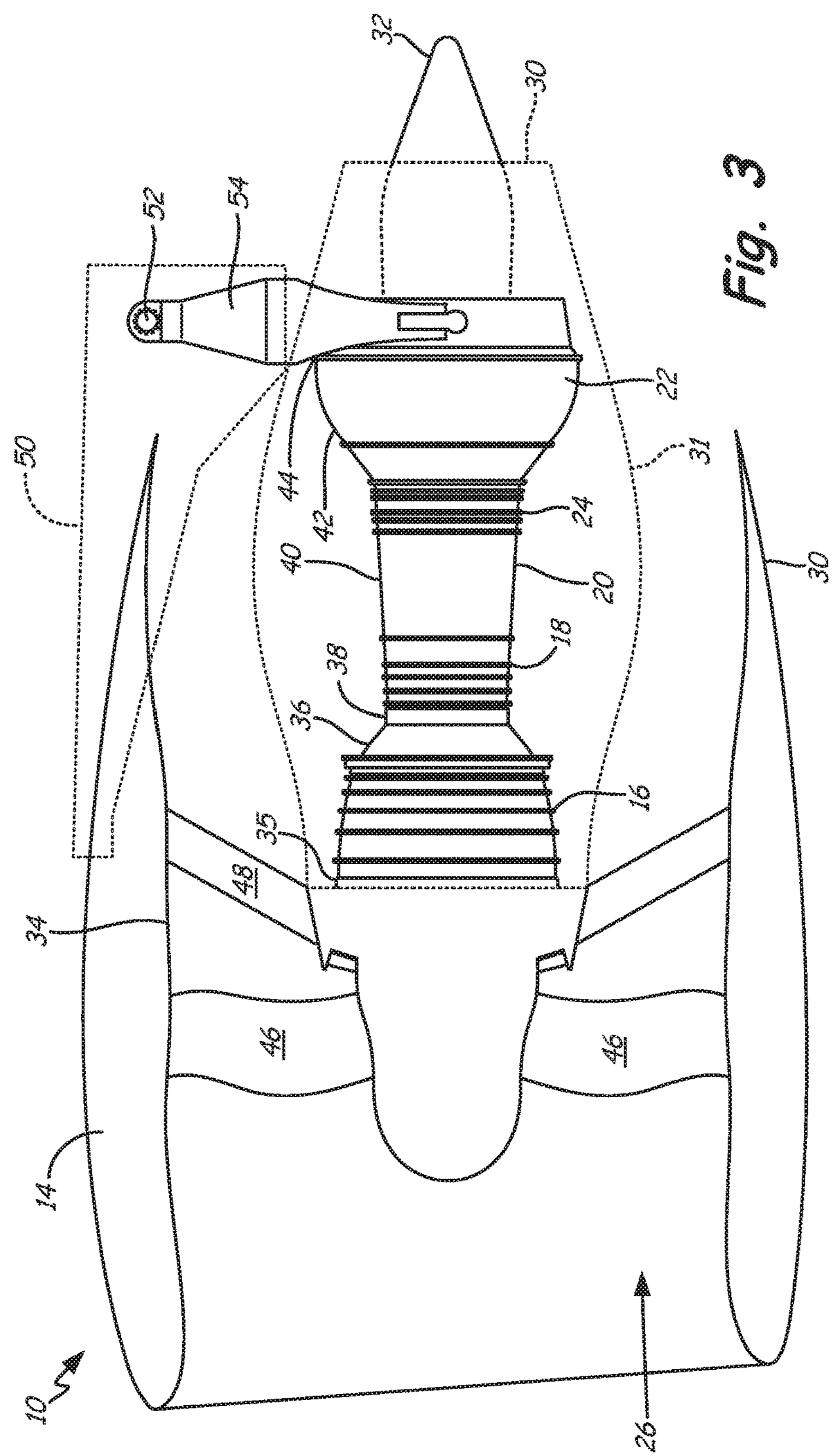
FIG. 3 is a cross-sectional view of a turbofan gas turbine engine.

FIG. 2 illustrates a perspective view of gas turbofan engine 10 suspended from an engine pylon 50. FIG. 3 illustrates a cross-sectional view of gas turbofan engine 10 with an engine nacelle assembly 14. Turbofan engine 10 includes a core engine within nacelle 14 that includes low pressure compressor 16, high pressure compressor 18, and combustor 20. Turbofan engine 10 also includes low pressure turbine 22 and high pressure turbine 24. Fan section 26 is connected to low pressure compressor 16 either directly or through a gear train (not shown).

High pressure compressor 18 and high pressure turbine 24 are connected by a common shaft, while low pressure compressor 16 and low pressure turbine 22 are similarly connected by a second shaft. The shafts are co-axial about a central axis of turbofan engine 10. Combustor 20 is arranged between high pressure compressor 18 and high pressure turbine 24. Airflow enters fan 26 and nacelle 14 which at least partially surrounds the core engine. Fan section 26 communicates airflow into nacelle 14 to low pressure compressor 16. Core airflow is compressed by low pressure compressor 16 and high pressure compressor 18, and then is mixed with the fuel in combustor 20 where the fuel is ignited, and burned. The resultant combustor products and exhaust are expanded through high pressure turbine 24 and low pressure turbine 22. Turbines 22 and 24 are rotationally coupled to compressors 16 and 18, respectively to drive compressors 16 and 18 in response to the expansion of the combustion process. Low pressure turbine 22 also drives fan section 26. A core engine exhaust exits turbine engine 10 through core nozzle 30 and tail cone 32 opposite fan section 26.

Turbine engine 10 generally has case structures including fan case 34, intermediate case 36, high pressure compressor case 38, combustor case 40, low pressure turbine case 42, and turbine exhaust case 44. Fan section 26 includes fan rotor with a plurality of circumferentially spaced radially outwardly extending fan blades 46. Fan blades 46 are surrounded by fan case 34. The core engine case structures are secured to nacelle 14 via fan case 34, which is connected to inlet case 35, which includes a multiple of circumferentially spaced radially extending struts 48 which radially span the core engine case structure and fan case 34. External components including electrical systems, lubrication systems, fuel systems, and the like (not illustrated) reside on the outside of the case structure and the inside of nacelle core cowls 31 of turbine engine 10.

Turbine exhaust case 44 connects turbine engine 10 to an aircraft through an attachment to pylon 50. The attachment is made by pin 52 secured to mount 54. In the embodiment of FIG. 2, the end of pylon 50 that is opposite pin 52 and mount 54 is connected to low pressure compressor case 33 or intermediate case 36. In FIG. 3, the end of pylon 50 that is opposite pin 52 and mount 54 is secured to fan case 34. Mount 54 is also connected to engine pads on turbine exhaust case 44.

Figure 4:
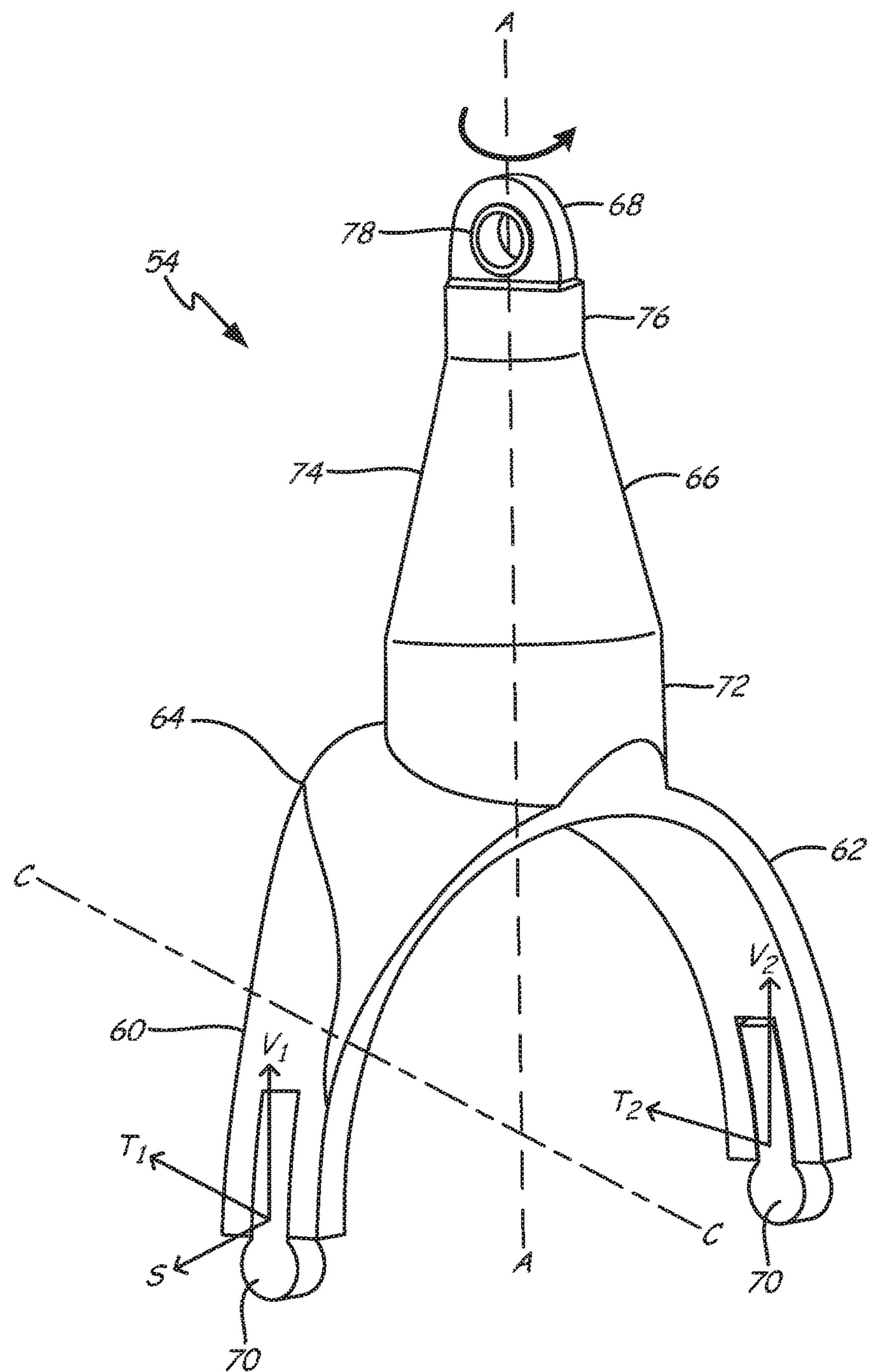
FIG. 4 is a perspective view of an engine mount.

FIG. 4 is a perspective view of mount 54, illustrating first and second legs 60 and 62 of yoke 64, stanchion 66, and bracket 68. Yoke 64 is illustrated as a semi-circular saddle that receives the generally circular turbine exhaust case 44 (see FIGS. 1 and 2). Yoke 64 has two legs, 60 and 62. Each leg 60 and 62 contains an aperture for fastener 70 for securing turbine exhaust case 44. Fasteners 70 may contain a ball joint to equalize thrust loads (T1 and T2) and vertical or torque loads (V1 and V2). Fastener 70 on second leg 62 is secured with a radially free pin on the joints, while fastener 70 on first leg 60 contains a different attachment that carries side loads S.

Figure 5:
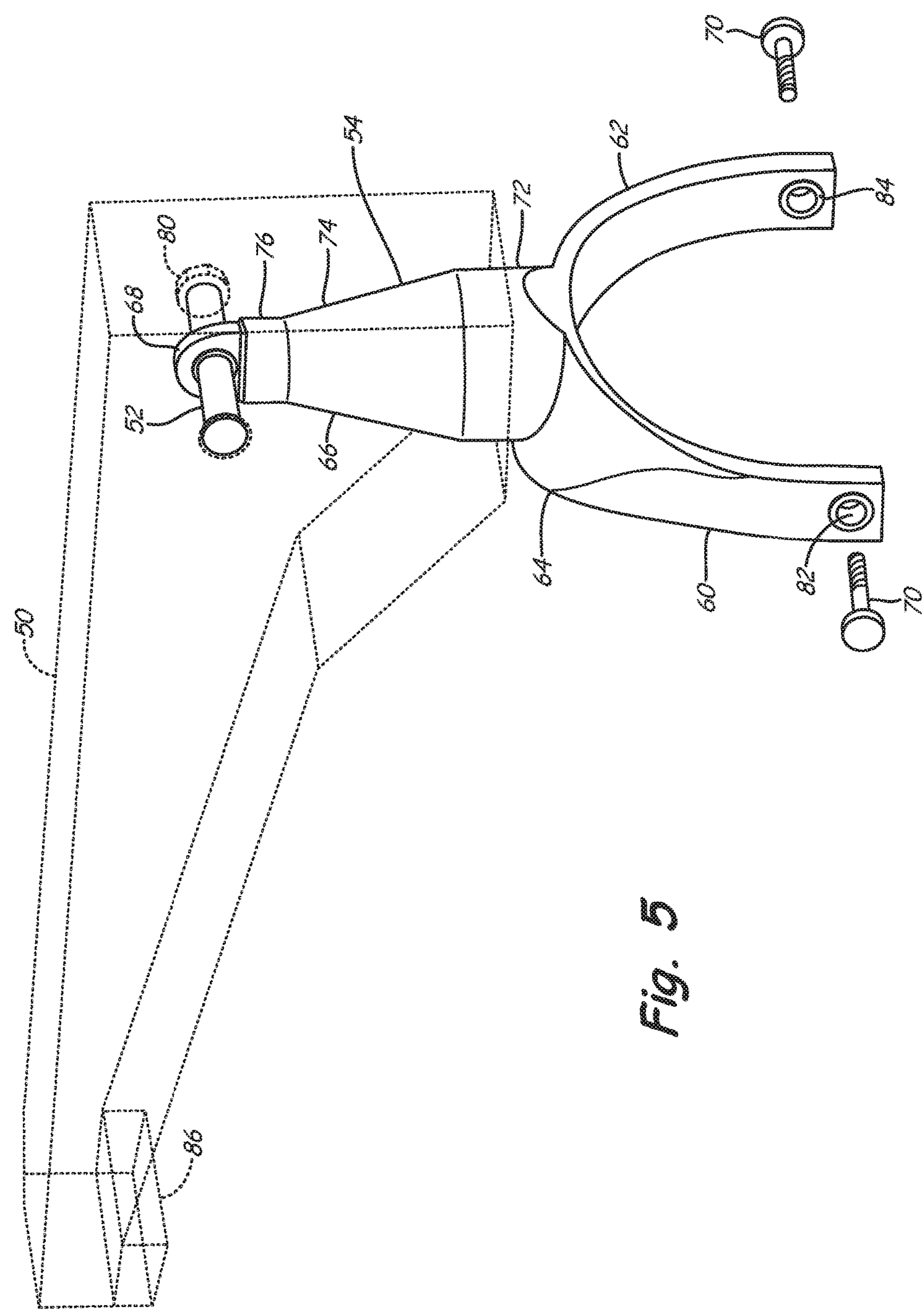
FIG. 5 is a perspective view of an engine mount attached to a pylon.

As illustrated in FIG. 5, fasteners 70 may be bolts, with the Bolton leg 62 attached in such a way as to allow radial movement. Apertures 82 are circular holes on each leg 60 and 62, and contain bearing 84. This is opposed to the slot that receives a fastener illustrated in FIG. 4.

Stanchion 66 is centrally secured to yoke 64. In the embodiment illustrated, stanchion is a vertical support post that has cylindrical section 72 attached to yoke 64, and conical section 74 attached to cylindrical section 72. Conical section 74 provides for a tapering of the cross-sectional area of stanchion 66, while cylindrical section 72 maximizes the amount of contact with pylon 50. Conical section 74 is also connected to smaller cylindrical section 76 that is attached to bracket 68. Tapering of the cross-sectional area allows for a reduced area adjacent pylon 50 where space is limited, whereas cylindrical section 72 is at an area of turbofan engine 10 that has a greater area to receive components.

Bracket 68 is D-shaped, and contains an aperture therein for receiving pin 52. The aperture may contain a spherical bearing 78. This allows bracket 68 to spin about a vertical axis A-A normal to a central axis C-C of turbine engine 10. In the embodiment illustrated and described, mount 54 allows for a determinate system having six degrees of freedom to compensate the various loads of turbine engine 10 with respect to pylon 50. Mount 54 is free to rotate about pin 52, thus allowing for T1=T2. Similarly, having only one leg to compensate for side loads S incorporates an allowance for thermal expansion and contraction of turbine exhaust case 44 during normal operation of turbofan engine 10. Having the mount legs 60 and 62 reach down to the same plane as the engine centerline, engine core bending due to thrust is eliminated.

Mount 54 eliminates the need for multiple links and bracket systems that include thrust links, connection links, and various other components for mounting turbine engine 10, as is the current state of the art illustrated in FIG. 1. The multiple components each address different loads. Mount 54 solves the multi-component issue by taking vertical, thrust, torque and side loads all within a single design piece. As illustrated in FIG. 5, this further simplifies mounting concerns as only a single pin 52 is needed to attach and remove mount 54 from pylon 50 of an aircraft. Pin 52 may be secured to pylon 50 with another fastener, such as nut 80. The aft end of turbine engine 10 may be mounted or dismounted in much less time compared to other designs. Additionally, there may be weight savings on turbine engine 10 as fewer components are accomplishing the same function. The front end of pylon 50 may be attached utilizing a mounting arrangement 86 known in the art. The attachment of the front of pylon 50 may be to the fan case, intermediate case, or similar acceptable structural component of turbofan engine 10.

Mount 54 is constructed from a high tensile, strong material such as steel or similar metal. Mount 54 may be machined from a solid block, or may be fabricated from several individual components secured together, such as by welding.

A method for mounting a turbine engine is provided by the aforementioned structure. In one embodiment, a method of mounting a gas turbine engine to a pylon is disclosed. The method includes attaching a mount bracket to the turbine exhaust case, and attaching a distal end of the mount bracket to the pylon with a single pin.

Additionally, the method may include attaching a first leg of a yoke of the mounting bracket to a first engine pad, and attaching a second leg of the yoke of the mounting bracket to a second engine pad. Attaching the second leg may be done by securing a bolt in such a way as to allow radial movement of the turbine exhaust case relative to the mount leg through an aperture of the second leg, whereas attaching the first leg may be done by securing a bolt through an aperture of the first leg so as to fix the joint to not allow radial movement or sliding of the mount leg on the bolt thus carrying engine side loads. The aperture of the first leg and the aperture of the second leg each may each contain a bearing, such as a ball joint. Similarly, the distal end of the mount bracket may contain a spherical bearing.

In another embodiment, a method for mounting a gas turbine engine having a compressor section, a combustor section, a turbine section, a pylon and a rear mount bracket, may include positioning the mounting bracket between the gas turbine engine and the pylon. The mounting bracket is connected to the turbine case reacting a least a vertical load, a side load, thrust and a torque load from the gas turbine engine through the mounting bracket. The mounting bracket is attached to the pylon reacting the same loads from the gas turbine engine to the pylon.

The mounting bracket may be connected to the pylon with a connection having a single pin passing through apertures in the pylon and mounting bracket. The method may also involve attaching a first leg of a yoke of the mounting bracket to a first engine pad, and attaching a second leg of the yoke of the mounting bracket to a second engine pad. Attaching the second leg may be done by securing a bolt in such a way as to allow radial movement of the turbine exhaust case relative to the mount leg through an aperture of the second leg, while attaching the first leg may be done by fixing the joint to provide the reacting of the side load. The aperture of the first leg and the aperture of the second leg may each contain a bearing providing the reacting of the torque and vertical loads. Again, the mount bracket may contain a spherical bearing to providing the reacting of the thrust load.

Discussion of Possible Embodiments

The following are non-exclusive descriptions of possible embodiments of the present invention.

A method of mounting a gas turbine engine to a pylon is disclosed. The method includes attaching a mount bracket to the turbine exhaust case, and attaching a distal end of the mount bracket to the pylon with a single pin.

The method of the preceding paragraph can optionally include, additionally and/or alternatively, any one or more of the following features and/or additional steps:

attaching a first leg of a yoke of the mounting bracket to a first engine pad;

attaching a second leg of the yoke of the mounting bracket to a second engine pad;

attaching the second leg may comprise securing a bolt in such a way as to allow radial movement of the turbine exhaust case relative to the mount leg through an aperture of the second leg;

attaching the first leg may comprise securing only a bolt through an aperture of the first leg;

the aperture of the first leg and the aperture of the second leg may each contain a bearing; and/or the distal end of the mount bracket contains a spherical bearing.

In another embodiment, a method for mounting a gas turbine engine having a compressor section, a combustor section, a turbine section, a pylon and a rear mount bracket, may include positioning the mounting bracket between the gas turbine engine and the pylon. The mounting bracket is connected to the turbine exhaust case reacting a least a vertical load, a side load, thrust and a torque load from the gas turbine engine through the mounting bracket. The mounting bracket is attached to the pylon reacting the same loads from the gas turbine engine to the pylon.

The method of the preceding paragraph can optionally include, additionally and/or alternatively, any one or more of the following features and/or additional steps:

connecting the mounting bracket to the pylon may be done with a connection comprising a single pin passing through apertures in the pylon and mounting bracket;

attaching a first leg of a yoke of the mounting bracket to a first engine pad;

attaching a second leg of the yoke of the mounting bracket to a second engine pad;

attaching the second leg may comprise securing a bolt in a way as to allow radial movement of the turbine exhaust case relative to the mount leg through an aperture of the second leg;

attaching the first leg may comprise securing only a bolt through an aperture of the first leg providing the reacting of the side load;

the aperture of the first leg and the aperture of the second leg may each contain a bearing providing the reacting of the torque and vertical loads; and/or the mount bracket may contain a spherical bearing to providing the reacting of the verticle load;

In yet another embodiment, a method of mounting a gas turbine engine to a pylon is done attaching a mounting bracket to a pylon with a single pin connection that reacts a verticle load of the engine, and attaching a yoke of the mounting bracket about a case of the gas turbine engine.

The method of the preceding paragraph can optionally include, additionally and/or alternatively, any one or more of the following features and/or additional steps:

the yoke has a first leg and a second leg, the first leg includes a first attachment fastener aperture and the second leg includes a second attachment fastener aperture, the first attachment fastener aperture and said second attachment fastener aperture defined along an attachment fastener axis which extends radially inward to intersect an engine axis;

the first leg and the second leg react vertical loads and thrust loads;

only the first leg also reacts a side load; and/or providing at least one spherical bearing in the mounting bracket.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An engine mount comprising:

a saddle-shaped yoke situated at a first end of a stanchion, the yoke comprising:

a first leg describing a partial circular arc about a point on the support axis, distal from the yoke; and a second leg mirroring the first leg across a support axis; and a bracket disposed at a second end of the stanchion and having an aperture containing a spherical bearing configured to receive a single pin; and the stanchion oriented along the support axis, wherein the stanchion comprises:

a distal cylindrical section adjacent the yoke;

a proximal cylindrical section adjacent the bracket, and of smaller radius than the distal cylindrical section; and a conical section connecting the proximal cylindrical section and the distal cylindrical section.

2. An engine mount comprising:

a stanchion oriented along a support axis;

a saddle-shaped yoke situated at a first end of the stanchion, the yoke comprising: a first leg describing a partial circular arc about a point on the support axis, distal from the yoke; and a second leg mirroring the first leg across the support axis; and a bracket disposed at a second end of the stanchion and having an aperture containing a spherical bearing configured to receive a single pin, wherein the bracket is D-shaped.

3. The engine mount of claim 2, wherein the saddle-shaped yoke spans a 180° semicircular arc.

4. The engine mount of claim 2, wherein the first leg contains a first aperture for a first fastener, and wherein the second leg contains a second aperture for a second fastener.

5. The engine mount of claim 4, wherein the first and second fasteners contain ball joints.

6. The engine mount of claim 4, wherein the first and second apertures each contain a bearing providing the reacting of the torque, thrust, and vertical loads.

7. The engine mount of claim 4, wherein the first fastener contains an attachment designed to carry side loads and the second fastener is secured with a radially free pin on a joint.

8. The engine mount of claim 4, wherein the first and second fasteners are bolts.

9. The engine mount of claim 8, wherein the second fastener is attached such that it allows radial movement of the mount.

* * * * *